United States Patent
Aihara et al.

(10) Patent No.: US 7,639,377 B2
(45) Date of Patent: Dec. 29, 2009

(54) DITHER PATTERN GENERATING APPARATUS FOR GENERATING DITHER PATTERN CORRECTED FOR DENSITY CHANGE ACCOMPANYING DETERIORATION WITH TIME

(75) Inventors: Nobuhiro Aihara, Osaka (JP); Hiroshi Sakai, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1038 days.

(21) Appl. No.: 11/008,223

(22) Filed: Dec. 10, 2004

(65) Prior Publication Data

US 2006/0055981 A1    Mar. 16, 2006

(30) Foreign Application Priority Data

Sep. 15, 2004    (JP)    ............... 2004-268478

(51) Int. Cl.
*G06F 15/00* (2006.01)
*G06K 1/00* (2006.01)
*G06K 15/00* (2006.01)

(52) U.S. Cl. .................. 358/1.13; 358/1.9
(58) Field of Classification Search ........... 358/1.9, 358/1.13, 504, 3.13
See application file for complete search history.

(56) References Cited

U.S. PATENT DOCUMENTS

| 5,694,527 | A | 12/1997 | Fujimoto et al. | |
|---|---|---|---|---|
| 5,953,459 | A | 9/1999 | Ueda et al. | |
| 6,081,353 | A * | 6/2000 | Tanaka et al. | 358/523 |
| 6,094,502 | A | 7/2000 | Hirata et al. | |
| 6,246,844 | B1 * | 6/2001 | Shiba | 399/49 |
| 6,288,795 | B1 * | 9/2001 | Urasawa | 358/3.09 |
| 6,515,770 | B1 | 2/2003 | Rao et al. | |
| 7,253,925 | B2 * | 8/2007 | Ito | 358/1.9 |
| 7,295,340 | B2 * | 11/2007 | Mestha et al. | 358/1.9 |

FOREIGN PATENT DOCUMENTS

| JP | 08-123112 | 5/1996 |
|---|---|---|
| JP | 09-247458 | 9/1997 |
| JP | 09-298663 | 11/1997 |
| JP | 2000-039762 A | 2/2000 |
| JP | 2001-111830 | 4/2001 |
| JP | 2004-038100 A | 2/2004 |

OTHER PUBLICATIONS

Official Action issued by the Japanese Patent Office on Oct. 10, 2006, in priority JP application No. 2004-268478, and English translation thereof.

* cited by examiner

*Primary Examiner*—Douglas Q Tran
(74) *Attorney, Agent, or Firm*—Buchanan Ingersoll & Rooney PC

(57) ABSTRACT

In a printer which corrects a density change by measuring densities of a plurality of output dither patterns (test patterns) by a sensor and obtaining a γ characteristic curve, the following processes are performed. Data of the present number of print sheets is obtained from a print sheet counter in the printer. On the basis of the obtained data, a proper sensor density curve is selected. A sensor value obtaining unit obtains density data of a generated test pattern. On the basis of the selected sensor density curve and the obtained density data, a γ characteristic curve is calculated. A dither pattern is generated based on the γ characteristic curve.

17 Claims, 11 Drawing Sheets

DITHER PATTERN GENERATING APPARATUS FOR GENERATING DITHER PATTERN CORRECTED FOR DENSITY CHANGE ACCOMPANYING DETERIORATION WITH TIME

This application is based on Japanese Patent Application No. 2004-268478 filed with the Japan Patent Office on Sep. 15, 2004, the entire content of which is hereby incorporated by reference.

BACKGROUND OF THE INVENTION

1. Field of the Invention

The present invention relates to a dither pattern generating apparatus, a dither pattern generating method, and a dither pattern generating program and, more particularly, to a dither pattern generating apparatus, a dither pattern generating method, and a dither pattern generating program used in the case of performing a binarizing process on an image by using a dither pattern.

2. Description of the Related Art

Many methods for correcting a density change accompanying deterioration with time of an output device at the time of binarizing an image and outputting the binary image by a dithering process have been proposed.

For example, Japanese Laid-Open Patent Publication No. 2001-111830 discloses a method of measuring a plurality of dither patterns which are output by a sensor and calculating a γ characteristic curve in order to generate a dither pattern having a linear characteristic by correcting a density change in an output device.

Japanese Laid-Open Patent Publication No. 09-298663 discloses a tone transforming apparatus for pre-storing original dither matrixes of a number of kinds larger than the number of tones of image data, transforming thresholds on the basis of a tone transforming characteristic which is set by the user, and storing the resultant as a dither matrix.

In the method disclosed in Japanese Laid-Open Patent Publication No. 2001-111830, a sensor value measured by a sensor in a printer is converted to an actual print density value on the basis of a fixed graph indicative of the relation between a sensor value and a print density value (hereinafter, referred to as "sensor density curve").

In reality, however, since an actual sensor density curve gradually changes due to fluctuations in environment, deterioration in an engine, and the like (generically also simply referred to as "change in environment"), there is a problem such that the present circumstances are not accurately reflected in an approximated γ characteristic curve.

FIG. 15(A) is a diagram showing a state where a sensor of a type of sensing reflection light (when a sensor value is large, print density is low and, when a sensor value is small, print density is high) is used, and the relation between the sensor value and the print density fluctuates according to endurance (increase in the number of print sheets).

As shown in FIG. 15(A), the relation between a sensor value and print density tends to gradually fluctuate from an initial curve (solid line) (to a broken line). Therefore, as shown in FIG. 15(B), when the relation (γ characteristic curve) between the pattern No. of a dither pattern and print density is estimated on the basis of an initial sensor density curve (solid line), a problem occurs such that it is deviated from a true γ characteristic curve (broken line) estimated on the basis of the sensor density curve after fluctuation.

The problem occurs for the following reason. Since the sensor senses reflection light, when the number of flaws in the surface of a medium (for example, an intermediate transfer belt) for outputting a dither pattern increases due to deterioration, irregular reflection components on a bare surface increases and the sensor sensitivity to a highlight area tends to increase. On the other hand, printed toner covers the flaws in the bare surface, so that the sensor value for a shadow area does not largely fluctuate also after deterioration.

As a result of a change in the sensor density, as shown in FIG. 15(B), the γ characteristic curve (solid line) of which density is generally lower than actual one (broken line) is erroneously estimated, and a γ correcting process cannot be performed properly.

SUMMARY OF THE INVENTION

The present invention has been achieved to solve the problem and its object is to provide a dither pattern generating apparatus, a dither pattern generating method, and a dither pattern generating program capable of generating a proper dither pattern even if there is a change in environment.

To achieve the object, according to an aspect of the invention, a dither pattern generating apparatus includes: a generator to generate a plurality of measurement patterns on the basis of a plurality of dither patterns corresponding to a measurement pattern; a sensor to measure a density of each of the generated plurality of measurement patterns; a converter to convert a sensor value of each of the plurality of measurement patterns obtained by the sensor into a print density; a calculator to calculate a γ characteristic curve associating the plurality of measurement patterns with print densities on the basis of the print densities of the plurality of measurement patterns converted by the converter; a dither pattern generator to generate a dither pattern on the basis of the calculated γ characteristic curve; an obtaining unit to obtain a change in environment in which the apparatus is used; and a corrector to correct a sensor value obtained by the sensor or a conversion algorithm of the converter in accordance with a result of obtaining of the obtaining unit.

According to the invention, a change in environment in which the apparatus is used is obtained. In accordance with the result of obtaining, a sensor value obtained by the sensor or a conversion algorithm is corrected. Thus, the invention can provide the dither pattern generating apparatus, dither pattern generating method, and dither pattern generating program capable of generating a proper dither pattern even if a change occurs in environment.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

An image processing system in a preferred embodiment of the invention will be described below.

A dither pattern generating method executed by the image processing system in the embodiment is to generate a dither pattern which is always desirable (whose γ characteristic is linear) irrespective of a change in density of an output device.

Figure 1:
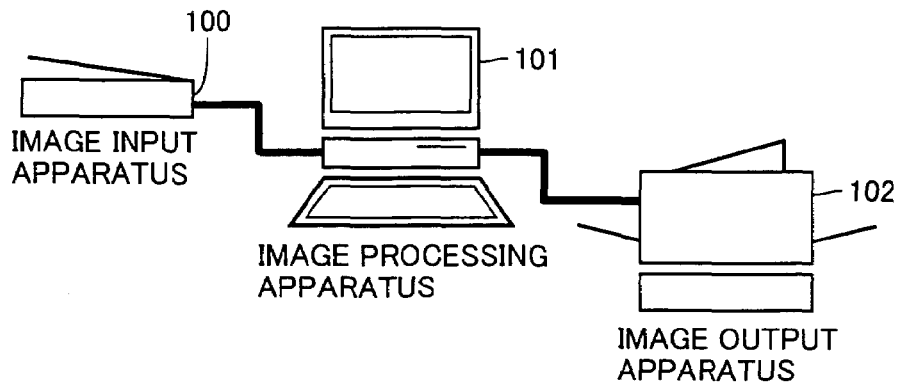
FIG. 1 is a diagram showing the configuration of an image processing system in an embodiment of the invention.

Referring to FIG. 1, the image processing system is constructed by an image input apparatus 100 typified by a scanner or the like, an image processing apparatus 101 taking the form of a computer, and an image output apparatus typified by a printer or the like.

Image data read by image input apparatus 100 is sent to image processing apparatus 101 where the image data is subjected to a proper process. The processed image data is transmitted to image output apparatus 102 and is output to a printing medium such as a paper sheet.

As image input apparatus 100, other than the scanner, a digital camera, a recording medium such as a storing device, a communication line, or the like may be used.

Figure 2:
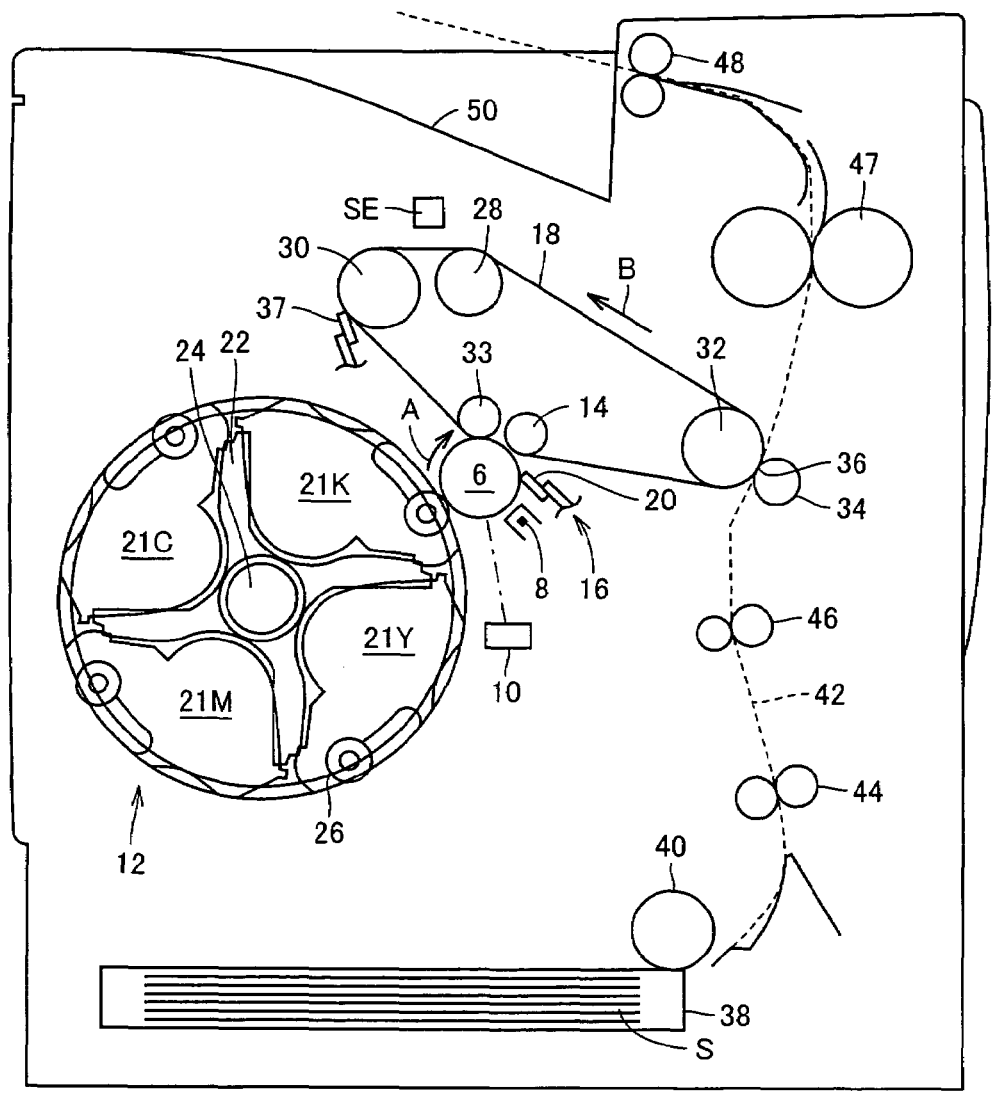
FIG. 2 is a diagram showing the configuration of an image output apparatus 102.

FIG. 2 is a diagram showing the configuration of image output apparatus 102.

In the following, an example of using a full-color laser printer (hereinafter, referred to as a printer) as image output apparatus 102 will be described.

In FIG. 2, image output apparatus 102 has, as an image carrier, a photosensitive drum 6 rotated in the direction of the arrow A by a not-shown motor in an almost center portion. Around photosensitive drum 6, a charger (in the example of the diagram, corona charger) 8 for uniformly charging the surface of photosensitive drum 6, a print head unit 10 for sequentially forming an electrostatic latent image color by color on photosensitive drum 6, a developing unit 12 for sequentially supplying toner of each color to photosensitive drum 6 to make the electrostatic latent image visible, a primary transfer roller 14, and a cleaner 16 are sequentially disposed along the rotation direction A of photosensitive drum 6.

Primary transfer roller 14 is provided to transfer toner adhered on photosensitive drum 6 onto an endless intermediate transfer belt 18. A predetermined bias voltage is properly applied from a not-shown bias power source to primary transfer roller 14. Primary transfer roller 14 is pressed against photosensitive drum 6 via intermediate transfer belt 18.

Cleaner 16 has a blade 20 which comes into contact with the surface of photosensitive drum 6 over almost the entire valid image area in the longitudinal direction of photosensitive drum 6 and scrapes off the toner residing on photosensitive drum 6 after the transfer.

The print head unit 10 selectively emits a laser beam to photosensitive drum 6 in accordance with image information. Specifically, when an image signal is input from an external apparatus (image processing apparatus 101) to an image signal processor (not shown) in image output apparatus 102, the image signal processor generates a digital image signal obtained by color-converting the image signal to yellow, cyan, magenta, and black, and the digital image signal is transmitted to an LED drive circuit (not shown) for the print head. On the basis of the input digital signal, the drive circuit controls print head unit 10 to expose photosensitive drum 6.

Developing unit 12 is obtained by sequentially attaching four developing elements 21 (21Y, 21M, 21C, and 21K) housing toners of yellow (Y), magenta (M), cyan (C), and black (K), respectively, each as a component developer to a development rack 22 while being shifted by 90° C. each in the counterclockwise direction, and is rotatable in the counterclockwise direction around a shaft 24 as a center. The toner contains as a lubricant, for example, calcium stearate, zinc stearate, strontium stearate, or the like. In developing unit 12, each time an electrostatic latent image of each color is formed on photosensitive drum 6, a development roller 26 of corresponding developing element 21 rotates so as to move to a position where it comes close to or comes into contact with photosensitive drum 6. To development roller 26, a predetermined bias voltage is properly applied from a not-shown bias power source.

Intermediate transfer belt 18 is supported by the peripheral portions of three rollers 28, 30, and 32 and is rotated in the direction of the arrow B. Roller 28 is a tension roller which given tension to intermediate transfer belt 18. Roller 32 is coupled to a drive motor (not shown). By the rotation of roller 32, rollers 28 and 30 are rotated. A roller 33 positioned immediate upstream of primary transfer roller 14 in the rotating direction B of intermediate transfer belt 18 presses intermediate transfer belt 18 against photosensitive drum 6, thereby assuring that intermediate transfer belt 18 travels between photosensitive drum 6 and primary transfer roller 14 in a state where intermediate transfer belt 18 is closely attached to photosensitive drum 6.

A secondary transfer roller 34 presses a portion of intermediate transfer belt 18 which is supported by roller 32. A predetermined bias voltage is applied to secondary transfer roller 34 from a not-shown bias power source, and a nip portion between secondary transfer roller 34 and intermediate transfer belt 18 is a secondary transfer area 36.

A blade 37 for scraping off the residual toner on intermediate transfer belt 18 is pressed against to the portion supported by roller 30, of intermediate transfer belt 18. Blade 37 and the secondary transfer roller 34 can be in contact with or apart from intermediate transfer belt 18.

In a lower part of image output apparatus 102, a paper feed cassette 38 is detachably disposed. Sheets S of paper stacked and housed in paper feed cassette 38 are sent to a conveyance path 42 one by one from the uppermost one by rotation of a paper feed roller 40.

Conveyance path 42 extends from paper feed cassette 38 via a nipped portion between a conveyance roller pair 44, a nipped portion between a timing roller pair 46, a secondary transfer area 36, a fixing roller 47, and a nipped portion between a paper ejection roller pair 48 to a paper ejection part 50 provided in the top face of image output apparatus 102.

The printing operation (image forming operation) of image output apparatus 102 will now be described.

At the time of start of printing operation, secondary transfer roller 34 and cleaning blade 37 are apart from intermediate transfer belt 18. When the printing operation starts, photosensitive drum 6 is rotated in the direction of the arrow A and intermediate transfer belt 18 is rotated in the direction of the arrow B at the same peripheral velocity, and the surface of photosensitive drum 6 is uniformly charged by charger 8.

Subsequently, developing unit 12 rotates, developing element 21Y moves to a development position and, after that, exposure is performed by printer head unit 10, thereby forming an electrostatic latent image of yellow toner on photosensitive drum 6. The electrostatic latent image is developed by developing element 21Y, and the developed yellow toner image is primary-transferred onto intermediate transfer belt 18 by the action of primary transfer roller 14. After that, developing element 21M moves to the development position and exposure, development, and primary transfer on a magenta toner image are performed. Developing element 21C moves to the development position and exposure, development, and primary transfer on a cyan toner image are performed. Developing element 21K moves to the development position and exposure, development, and primary transfer on a black toner image are performed. In such a manner, the toner images of the colors are primary-transferred so as to be sequentially overlaid on intermediate transfer belt 18 moving in the direction of the arrow B.

On completion of the primary transfer of black, secondary transfer roller 34 and cleaning blade 37 are pressed against intermediate transfer belt 18. The overlaid toner images formed on intermediate transfer belt 18 reach secondary transfer area 36 with movement of intermediate transfer belt 18. In secondary transfer area 36, the overlaid toner images are secondary-transferred in a lump onto the sheets S sent from paper feed cassette 38 to conveyance path 42 by the action of secondary transfer roller 34 and supplied by timing roller pair 46. After completion of the secondary transfer, secondary transfer roller 34 is apart from intermediate transfer belt 18. Toner residing on intermediate transfer belt 18 after the secondary transfer is removed by blade 37.

Sheet S on which the toner image is secondary transferred is sent via conveyance path 42 to fixing roller 47 where the toner image is fixed on sheet S of paper. Sheet S is ejected via paper ejection roller pair 48 to paper ejection part 50.

In the embodiment, when photosensitive drum 6 rotates without a toner image, charger 8, print head unit 10 (which construct an electrostatic latent image forming unit) and developing unit 12 are driven to form a toner image (hereinafter, referred to as a patch image) on photosensitive drum 6. At this time, application of voltage to primary transfer roller 14 is stopped. As a result, a patch image on photosensitive drum 6 passes through the primary transfer area and can reach the position of contact with cleaning blade 20. Therefore, even when rotation of photosensitive drum 6 without a toner image repeats, a sufficient amount of toner accumulates between the tip of cleaning blade 20 and the surface of photosensitive drum 6, and an inconvenience such as "scarfing" of blade 20 can be prevented due to the action of the lubricant included in the toner. Preferably, a patch image is a band-shaped image extending almost over an effective image area in the longitudinal direction of photosensitive drum 6 (that is, the area in contact with blade 20). It is preferable to form at least two band patch images each having a width (length in the rotation direction A of photosensitive drum 6) of at least 1 mm at almost equal time intervals in each period of rotation without a toner image.

The periods in which photosensitive drum 6 rotates without a toner image include: a period in which, after start of printing operation, intermediate transfer belt 18 is rotated without a toner image before primary transfer of a yellow toner image from photosensitive drum 6 to intermediate transfer belt 18, after primary transfer of a black toner image so that another toner image, or to overlay another toner image onto a toner image already primarily transferred on intermediate transfer belt 18; a period since photosensitive drum 6 starts rotating and warming-up after turn-on of image output apparatus 102 until start of printing; a period in which, in the case of performing continuous printing, after completion of previous printing until the next printing, and a period of continuing driving of a main motor for a while to rotate photosensitive drum 6 after completion of printing operation to execute predetermined post-operation of image output apparatus 102.

A sensor SE for measuring density of a test pattern on intermediate transfer belt 18 formed by a dither matrix is provided in a position near intermediate transfer belt 18 and between rollers 28 and 30.

Figure 3:
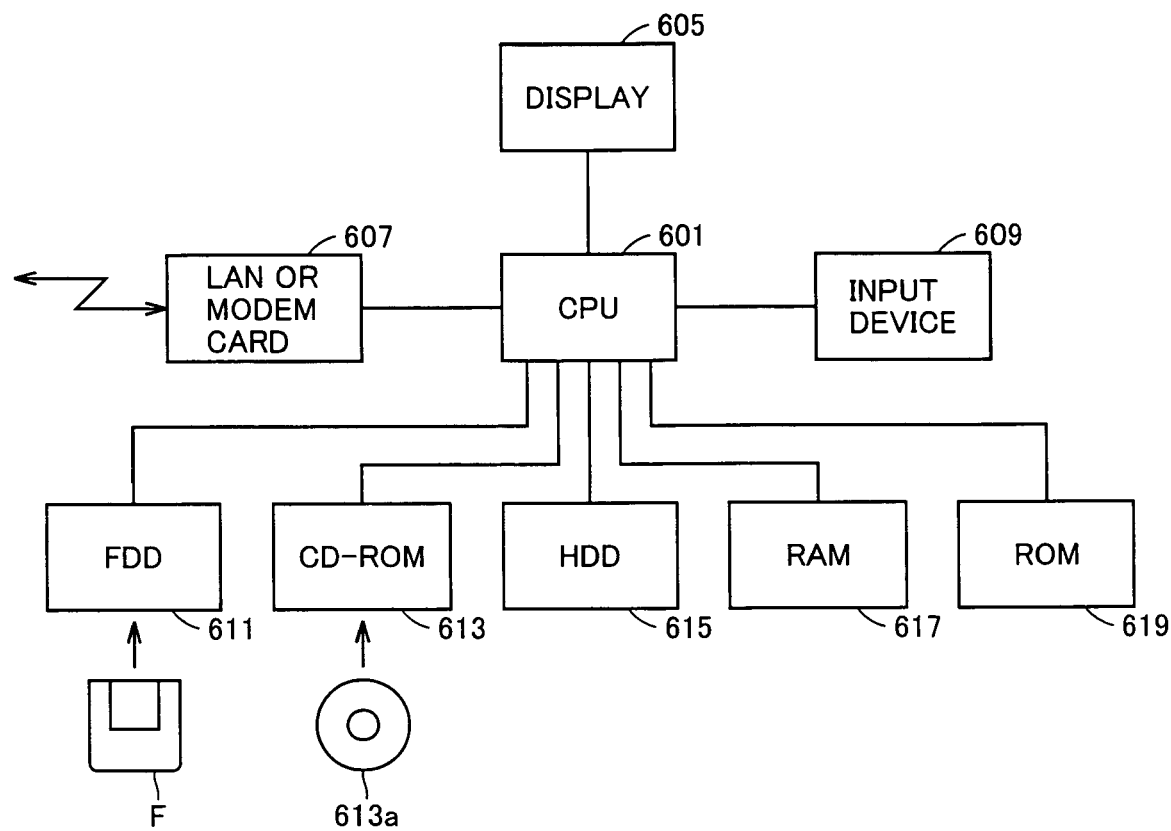
FIG. 3 is a block diagram showing a hardware configuration of an image processing apparatus 101 in FIG. 1.

FIG. 3 is a block diagram showing the hardware configuration of image processing apparatus 101 of FIG. 1.

Referring to FIG. 3, image processing apparatus 101 has a CPU 601 for controlling the whole apparatus, a display 605, an LAN (Local Area Network) card (or modem card) 607 for connection to a network and performing communication with the outside, an input device 609 constructed by a keyboard, a mouse, and the like, a flexible disk drive 611, a CD-ROM drive 613, a hard disk drive 615, a RAM 617, and a ROM 619.

A program for driving CPU (computer) 601 can be recorded on a recording medium such as a flexible disk F, a CD-ROM 613a, or the like. The program is sent from the recording medium to another recording medium such as a RAM and recorded. The program may be recorded on a recording medium such as a hard disk, ROM, RAM, or memory card and provided to the user. Such a program may be downloaded from an outside site via the Internet and executed.

Figure 4:
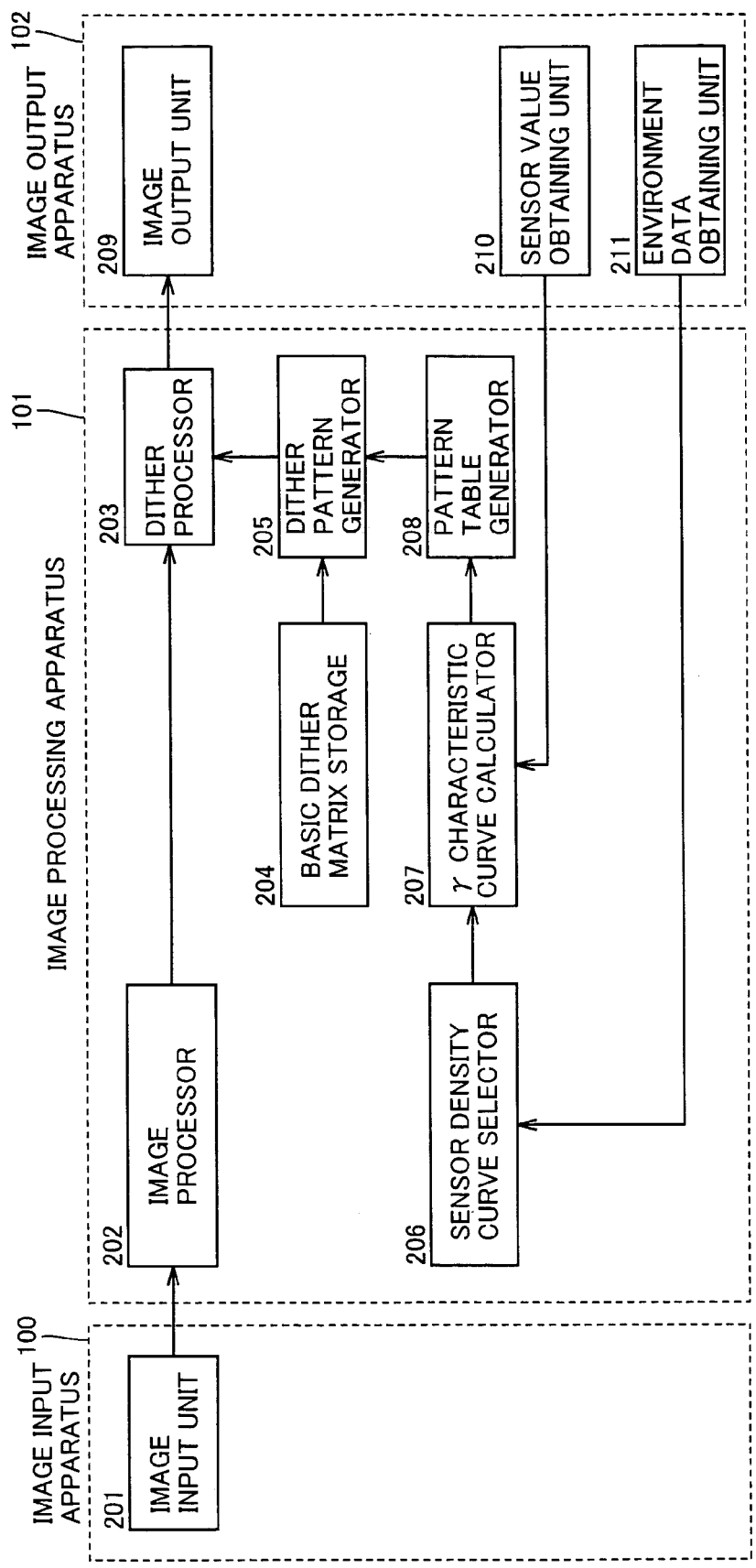
FIG. 4 is a block diagram showing a detailed configuration of the system of FIG. 1.

FIG. 4 is a block diagram showing the detailed configuration of the system of FIG. 1.

Referring to FIG. 4, image input apparatus 100 includes an image input unit 201.

Image processing apparatus 101 has an image processor 202, a dither processor 203, a basic dither matrix storage 204, a dither pattern generator 205, a sensor density curve selector 206, a γ characteristic curve calculator 207, and a pattern table generator 208.

Image output apparatus 102 includes an image output unit 209 as a printer engine, a sensor value obtaining unit 210 including a density measuring unit (density sensor), and an environment data obtaining unit 211.

Image data input from image input unit 201 is sent to image processor 202 where a proper image process is performed and, after that, the processed image is converted to multivalue CMYK data.

The CMYK data after conversion is sent to dither processor 203 and subjected to a binarizing process with a dither pattern generated by dither pattern generator 205, thereby converting the CMYK data to binary CMYK data.

The binary CMYK data is sent to image output unit 209 and is printed out.

Basic dither matrix storage 204 stores a basic dither pattern which can reproduce the number "b" of tones equal to or larger than the number "a" of tones (b≧a) reproduced by image processor 101.

Sensor density curve selector 206 selects a sensor density curve which associates a sensor value with printing density on the basis of environment data (for example, data indicative of the number of print sheets) obtained by environment data obtaining unit 211 from a plurality of sensor density curves prepared. Specifically, a proper curve is selected from a plurality of sensor density curves in accordance with a change in the environments, endurance of the apparatus, and the like. Alternatively, sensor density curve selector 206 may correct an initial sensor density curve on the basis of the environment data and calculate a proper sensor density curve.

γ characteristic curve calculator 207 generates a present γ characteristic curve indicative of the correspondence between a dither pattern and printing density on the basis of a selected sensor density curve and densities of a plurality of test patterns measured by sensor value obtaining unit 210.

Pattern table generator 208 generates an output pattern table as a table for associating each of the reproduction tones "a" with any of the tones "b" which can be expressed by the basic dither matrix. In other words, the calculated γ characteristic curve is sent to pattern table generator 208 where an output pattern table (table showing the correspondence between an output tone and a dither pattern number) is generated.

The basic dither matrix stored in basic dither matrix storage 204 and the generated pattern table are sent to dither pattern generator 205 where a dither pattern for output is generated.

Figure 5:
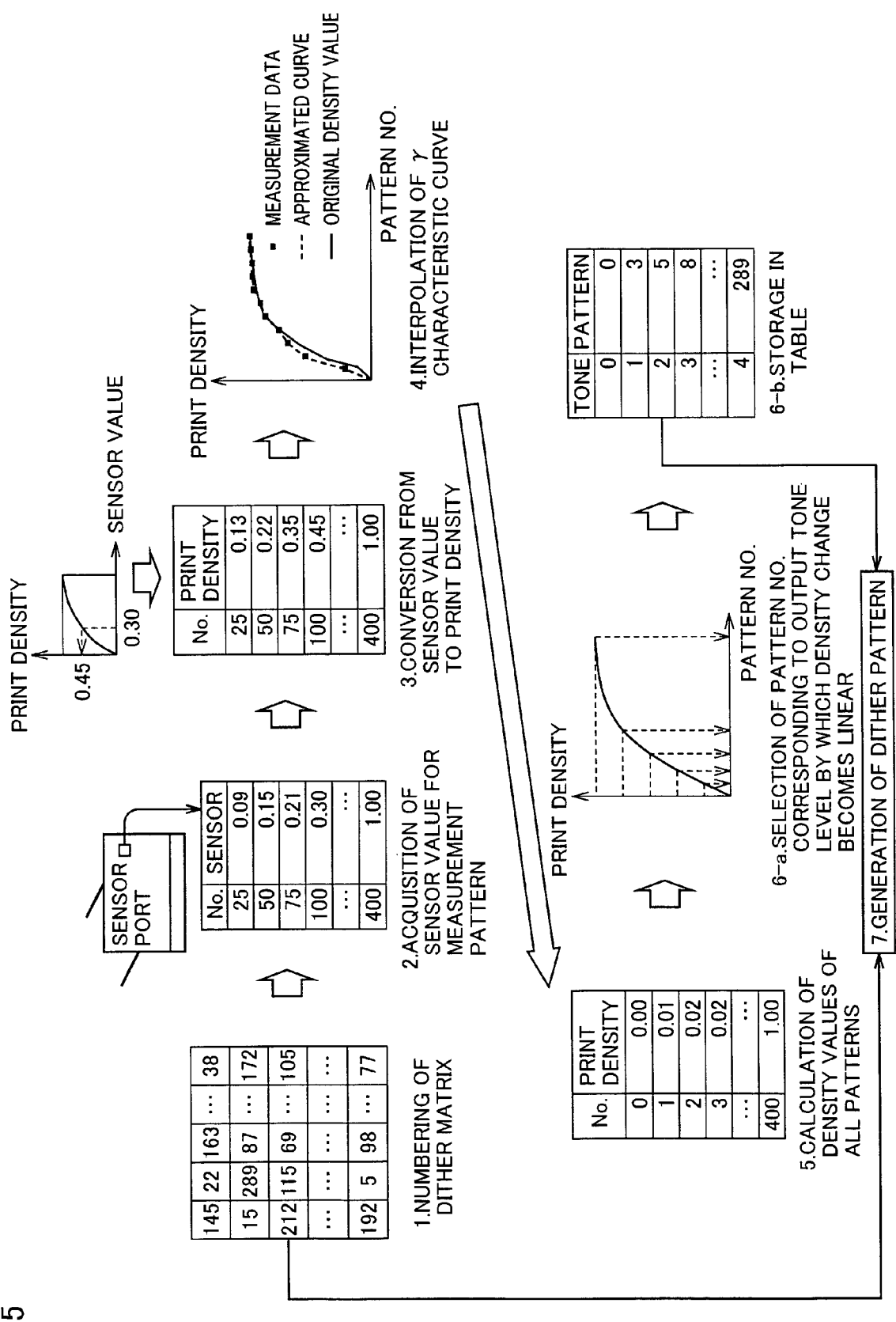
FIG. 5 is a diagram for explaining a process of generating a dither pattern.

FIG. 5 is a diagram for explaining a process of generating a dither pattern.

Referring to FIG. 5, as a pre-process of dither pattern generation, first, numbers from 1 to M×N are designated to elements of a dither matrix of an M×N size and initial density values for all of patterns are obtained in advance (No. 1 in FIG. 5).

As an actual density correcting process, the following process is performed.

First, a plurality of measurement patterns are output onto intermediate transfer belt 18 and their density values are measured by sensor SE (No. 2 in the diagram).

By using a selected sensor density curve, a sensor value obtained by measurement is converted to an actual printing density value (No. 3 in the diagram).

Next, an interpolating process is performed by using all of the initial pattern density values obtained by the process of No. 1 in the diagram and actual print density values, thereby estimating a γ characteristic curve (No. 4 in the diagram).

On the basis of the γ characteristic curve obtained by the process of No. 4 in the diagram, the density values of all of the present patterns are estimated (No. 5 in the diagram).

A pattern number corresponding to an output tone level is selected so that changes in the density values become linear, and stored into a pattern table (Nos. 6-a and 6-b in the diagram).

On the basis of a dither matrix and the pattern table, a dither pattern is generated (No. 7 in the diagram).

Figure 6:
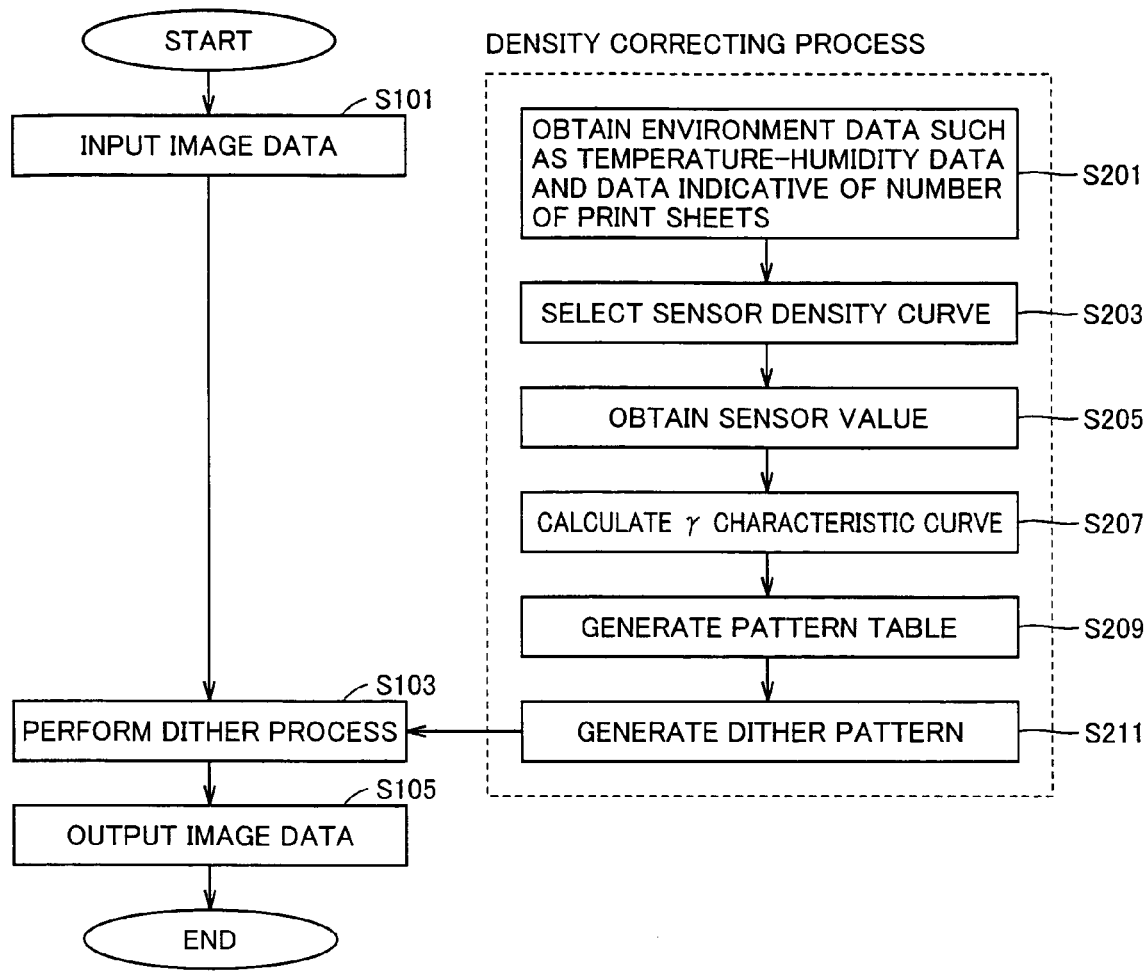
FIG. 6 is a flowchart of a dither process executed by the image processing system.

FIG. 6 is a flowchart of the dither process executed by the image processing system in the embodiment.

First, as density correcting process, in step S201, environment data obtaining unit 211 obtains data indicative of the present number of print sheets from a counter of the number of print sheets in image output apparatus 102 or the like (or may obtain, as environment data, data of temperature, moisture, or the like obtained by the sensor). In step S203, based on the obtained data, a proper sensor density curve is selected.

In step S205, sensor value obtaining unit 210 obtains density data of the generated test pattern. In step S207, calculation of a γ characteristic is executed. In step S209, a pattern table is generated. In step S211, a dither pattern is generated.

In the image process, image data is input in step S101. In step S103, a dither process using the dither pattern generated in step S211 is performed. In step S105, the image data subjected to the dither process is output.

Figure 7:
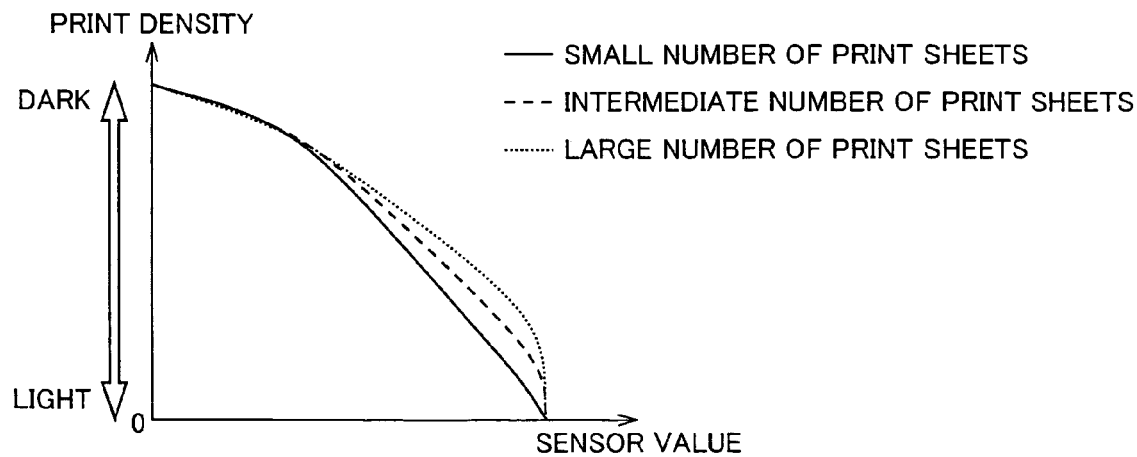
FIG. 7 is a diagram showing a concrete example of three kinds of sensor density curves.

FIG. 7 is a diagram showing a concrete example of three kinds of sensor density curves selected when the number of print sheets is small (beginning), when the number of print sheets is medium (intermediate period), and when the number of print sheets is large (ending).

In the example, normalized sensor values and normalized printing density values are used.

An actual method of selecting a sensor density curve is performed as follows. Thresholds are set in advance as 0 to 4,999 for the small number of print sheets, 5,000 to 9,999 for the medium number of print sheets, and 10,000 or more for the large number of print sheets. The range to which the data indicative of the number of printing sheets corresponds is checked, and a corresponding sensor density curve is selected.

Figure 15:
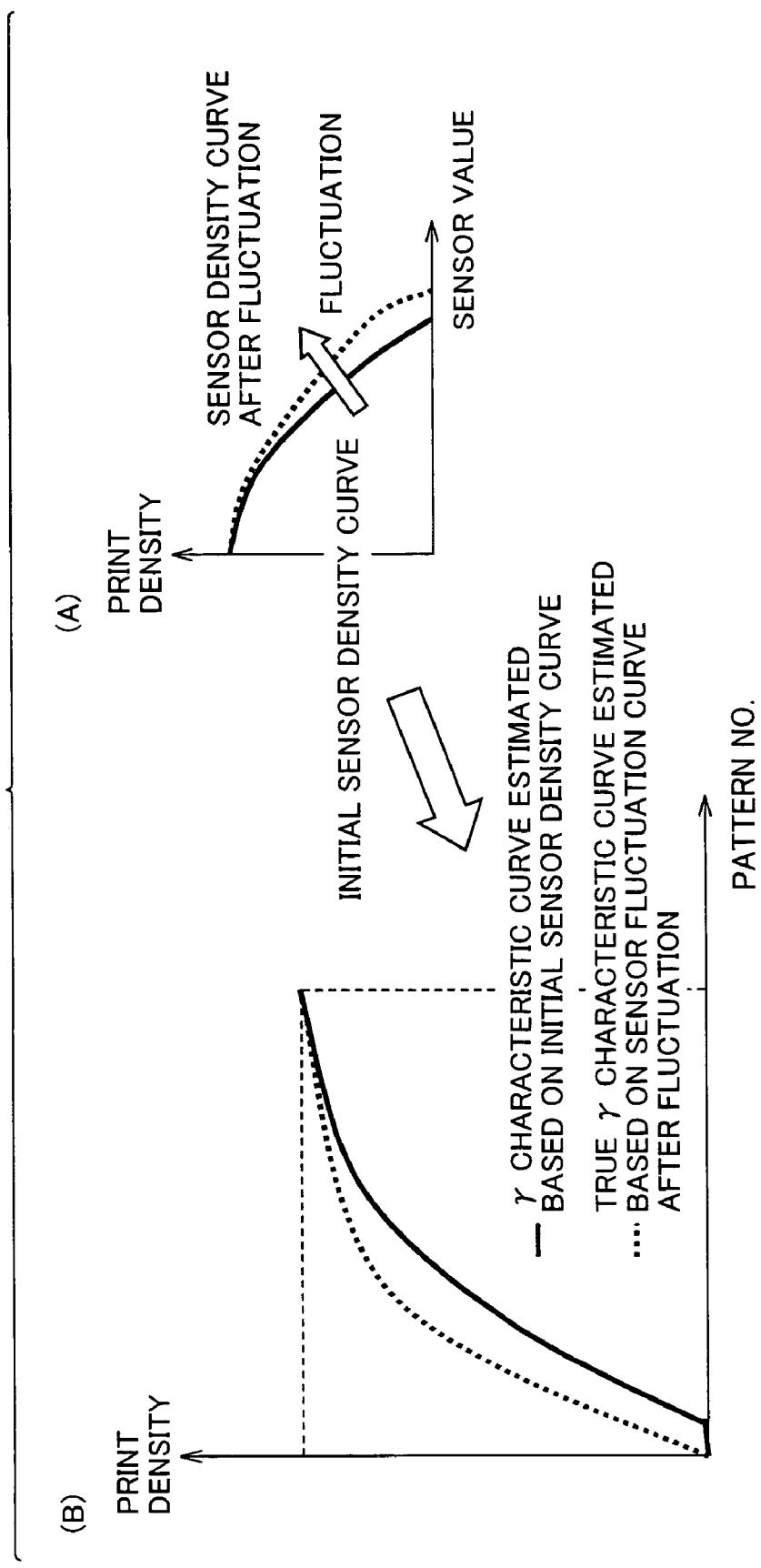
FIGS. 15(A) and 15(B) are diagrams showing a state where the relation between the sensor value and print density fluctuates as the number of print sheets increases.

By the above, as seen from FIG. 15, effects are produced such that the γ characteristic curve in which the sensor value based on a change in the environment and an actual change in printing density are considered can be calculated, and a proper image process can be performed.

Figure 8:
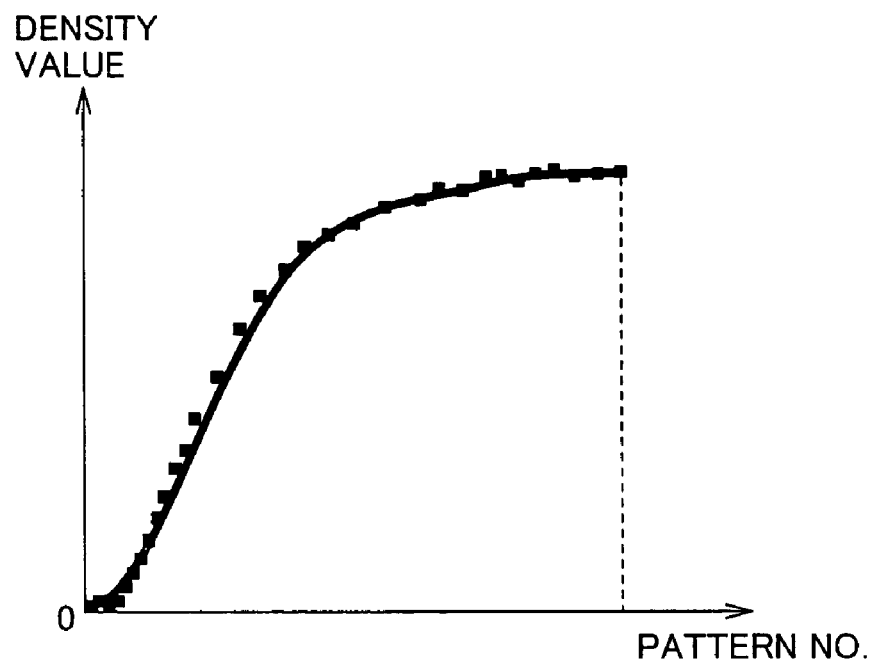
FIG. 8 is a diagram showing a concrete example of a γ characteristic curve.

FIG. 8 is a diagram showing a concrete example of the γ characteristic curve.

When a printing pattern for γ correction is printed on intermediate transfer belt 18 and measured by sensor SE, the relation between the present measurement patterns and sensor values is obtained. By using the selected sensor density curve, the relation between the present measurement pattern and the sensor value is transformed to the relation between a measurement pattern and a density value. Based on this, a γ characteristic curve as shown in FIG. 8 is calculated.

A γ characteristic curve is calculated by approximation with a multi-dimensional curve such as a quintic curve by using the least square method or the like. A highlight area, a shadow area, or the like may be approximated with a straight line or the like separately.

Figure 9:
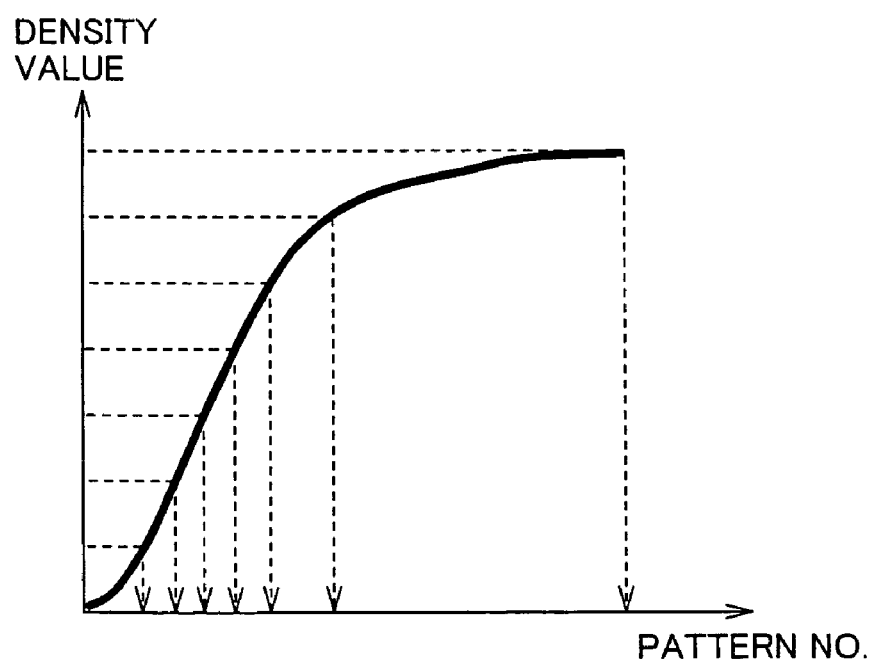
FIG. 9 is a diagram showing a process of selecting a pattern which makes a density change linear.

FIG. 9 is a diagram showing a process of selecting a pattern by which a density change becomes linear.

Referring to FIG. 9, 256 pattern numbers whose density change becomes linear are selected on the basis of the estimated γ characteristic curve. In such a manner, a pattern table for output is generated.

Finally, a dither pattern for output is generated by using the pattern table for output and the pre-stored basic dither matrix.

In the foregoing embodiment, a plurality of kinds of sensor density curves are held in advance and a proper sensor density curve is selected. However, the invention is not limited to the foregoing embodiment. It is estimated that, for example, as the number of print sheets increases, the sensor density curve becomes smoother. Consequently, a sensor density curve is set for each of the case (A) where the number of print sheets is small (zero) and the case (B) where the number of print sheets is medium (5,000). When the number of print sheets lies in the range from 1 to 4,999, the two curves are weighted and a sensor density curve may be obtained by calculation.

Specifically, when the printing density of the case (A) is set as Fa(s) and that of the case (B) is set as Fb(s) with respect to the sensor value (s), the printing density after the number "x" of print sheets can be calculated as follows.

$$(Fa(s)*(5000-x)+Fb(s)*x)/5000.$$

In the foregoing embodiment, the example of using the data indicative of the number of print sheets as environment data by which the sensor density curve is switched has been described. The invention however is not limited to the example. For example, there may be a case where sensor precision itself fluctuates due to a change in temperature and humidity or the like. That is, the method according to the invention can be applied to all of the cases where the sensor density curve fluctuates due to various factors.

According to the embodiment, the sensor value itself is directly corrected according to a fluctuation in environment and endurance, so that high-precision γ correcting process can be performed.

Second Embodiment

The general configuration of an image processing system of a second embodiment is similar to that of the first embodiment, so that its description will not be repeated.

In the second embodiment, in the case of transferring a measurement pattern (toner patch) to be subjected to density detection by a sensor to a medium such as an intermediate transfer belt, by disposing a white patch (a portion in which a measurement pattern is not formed, that is, a portion to which toner is not adhered) around the toner patch, the surface state of the medium is detected. A sensor value is offset by using the data.

In such a manner, a sensor value containing only a toner density component can be obtained, so that the high-precision image forming process can be performed.

Figure 10:
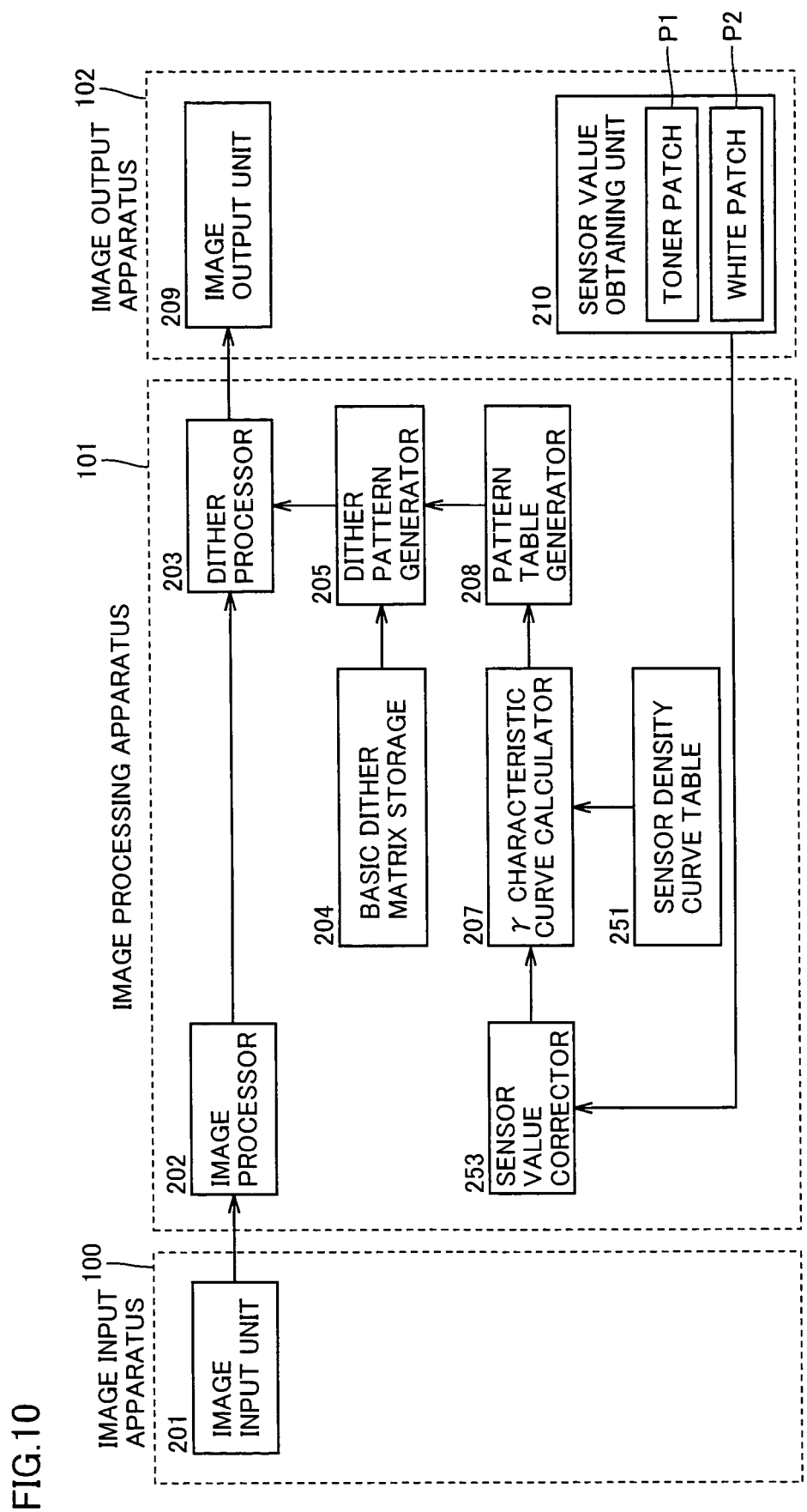
FIG. 10 is a block diagram showing a detailed configuration of a system in a second embodiment.

FIG. 10 is a block diagram showing a detailed configuration of the system in the second embodiment and corresponds to FIG. 4.

Referring to FIG. 10, image input apparatus 100 includes image input unit 201.

Image processing apparatus 101 has image processor 202, dither processor 203, basic dither matrix storage 204, dither pattern generator 205, a sensor value corrector 253, γ characteristic curve calculator 207, pattern table generator 208, and a sensor density table storage 251.

Image output apparatus 102 includes image output unit 209 as a printer engine and sensor value obtaining unit 210 including a density measuring unit (density sensor).

Sensor value obtaining unit 210 forms a toner patch P1 and a white patch P2 by toner on a medium and obtains densities of the patches.

Image data input from image input unit 201 is sent to image processor 202 where a proper image process is performed and, after that, the processed image is converted to multivalue CMYK data.

The CMYK data after conversion is sent to dither processor 203 and subjected to a binarizing process with a dither pattern generated by dither pattern generator 205, thereby converting the CMYK data to binary CMYK data.

The binary CMYK data is sent to image output unit 209 and is printed out.

Basic dither matrix storage 204 stores a basic dither pattern which can reproduce the number "b" of tones equal to or larger than the number "a" of tones (b≧a) reproduced by image processor 101.

Sensor value corrector 253 corrects a sensor value on the basis of density data of toner patch P1 and density data of white patch P2 obtained by sensor value obtaining unit 210.

γ characteristic curve calculator 207 generates a present γ characteristic curve indicative of the correspondence between a dither pattern and printing density on the basis of the corrected sensor value and the sensor density curve table.

Pattern table generator 208 generates an output pattern table as a table for making each of the reproduction tones "a" associated with any of the tones "b" which can be expressed by the basic dither matrix. Specifically, the calculated γ characteristic curve is sent to pattern table generator 208 where an output pattern table (table showing the correspondence between an output tone and a dither pattern number) is generated.

The basic dither matrix stored in basic dither matrix storage 204 and the generated pattern table are sent to dither pattern generator 205 where a dither pattern to be output is generated.

Figure 11:
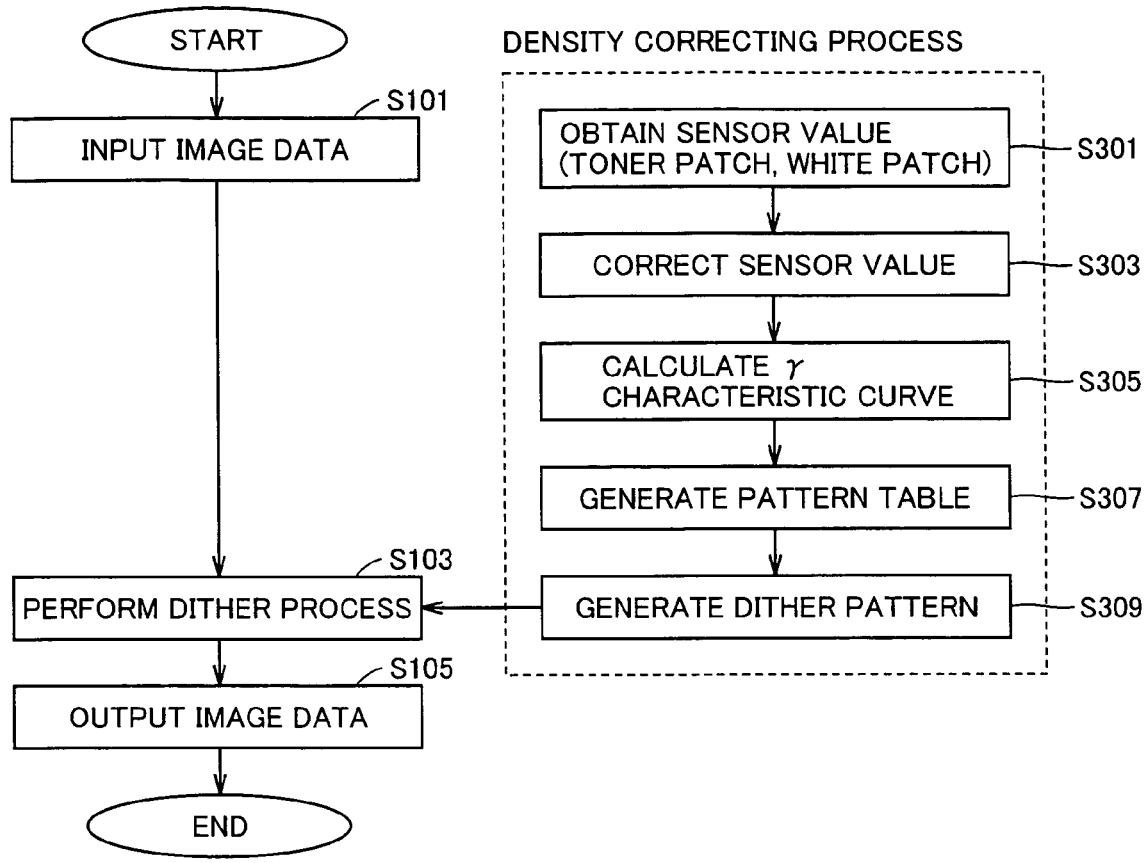
FIG. 11 is a flowchart of a dither process executed by the image processing system in the second embodiment.

FIG. 11 is a flowchart of the dither process executed by the image processing system in the embodiment.

First, as density correcting process, in step S301, density of a toner patch for density measurement and density of a white patch for measuring the state of a medium are obtained by sensor SE. In step S303, based on the obtained data, a sensor value is corrected.

In step S305, based on the corrected sensor value, calculation of a γ characteristic is executed. In step S307, a pattern table is generated. In step S309, a dither pattern is generated.

In the image process, image data is input in step S101. In step S103, a dither process using the dither pattern generated in step S309 is performed. In step S105, the image data subjected to the dither process is output.

A process of generating a dither pattern by using 256 patches will now be described. The number of patches is assigned according to resolution of an image process and the number of lines. A case of assigning 1200 dpi/150 lines and 2400 dpi/150 lines will be described as an example.

Figure 12:
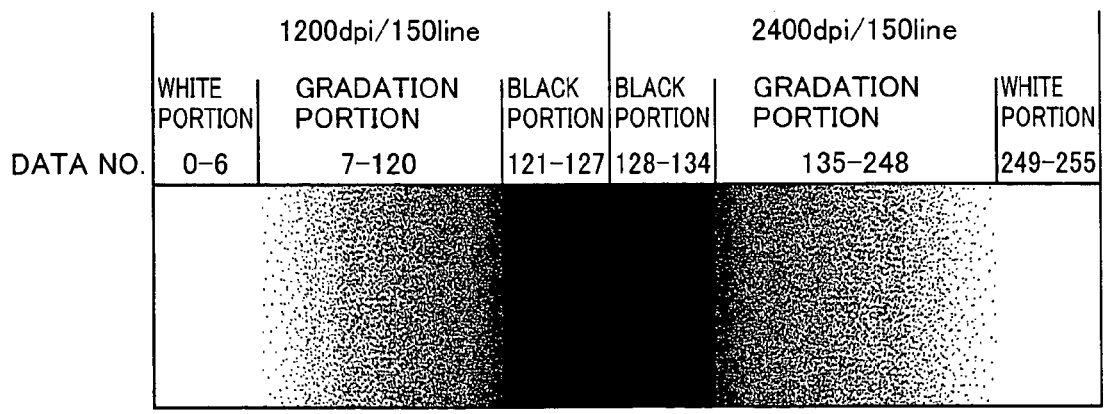
FIG. 12 is a diagram showing a concrete example of patches formed on an intermediate transfer belt.

FIG. 12 is a diagram showing a concrete example of patches formed on the intermediate transfer belt.

Referring to the diagram, the horizontal direction indicates the direction in which the intermediate transfer belt moves. Nos. 0 to 127 in the left half correspond to patches of 1200 dpi/150 lines and Nos. 128 to 255 in the right half correspond to patches of 2400 dpi/150 lines.

The patches of Nos. 0 to 6 and Nos. 249 to 255 are white patches in which toner is not adhered. The white patches are measured by sensor SE and obtained sensor values are used as reference values and indicated by the following variations.

reference value (1) of 1200 dpi/150 lines: WhiteBaseData1 reference value (2) of 2400 dpi/150 lines: WhiteBaseData2

An average value of the reference values is used as a general reference value and is expressed by the following equation.

general reference value: WhiteBaseData=(WhiteBaseData1+WhiteBaseData2)/2

From the difference between the general reference value (WhiteBaseData) and each of the reference values (WhiteBaseData1 and WhiteBaseData2), a value of a bare face fluctuation of the intermediate transfer belt is read. By subtracting the read data from sensor raw data, the data is corrected.

Raw data of the sensor is corrected by the following equation.

In the case of 1200 dpi/150 lines destTempData[i].data=srcData[i].data−((127−i)/127)×
(WhiteBaseData1−WhiteBaseData)

where variables indicate as follows.
destTempData[i].data: corrected data
srcData[i].data: sensor raw data
i: data No. (7 to 127)
((127−i)/127): influence degree coefficient
In the case of 2400 dpi/150 lines destTempData[i].data=srcData[i].data−((i−128)/127)×
(WhiteBaseData2−WhiteBaseData)

where ((i−128)/127) indicates an influence degree coefficient.

The decree of influence of a state fluctuation of the bare surface of the belt varies according to the patch density (a patch having low density is easily influenced by the state of the belt under it but a patch having high density is not easily influenced by the state of the belt under it). The influence degree coefficient is to correct the influence based on such patch density. The value is set so that the lower the density of the patch becomes, the higher the degree of influence becomes.

As described above, in the embodiment, a sensor value from which a fluctuation component of environment component is eliminated can be obtained. Consequently, the relation between the sensor value which is set in the beginning and toner density (ΔE) can be maintained to be constant. There is an effect such that the precision of image process improves.

Figure 13:
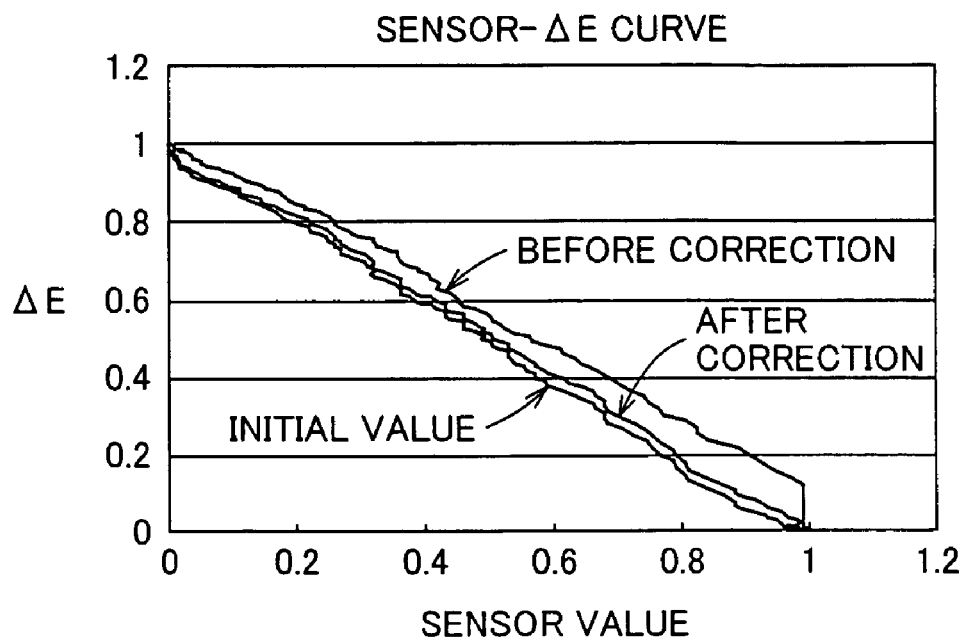
FIG. 13 is a diagram showing an example of the relation between a sensor value and density (ΔE)

FIG. 13 is a diagram showing an example of the relation between the sensor value and density (ΔE).

When the intermediate transfer belt deteriorates, even at the same density, the sensor value tends to increase. In the embodiment, the density of the white patch is measured and a change in the sensor value is corrected. Consequently, as shown in FIG. 13, even if the intermediate transfer belt deteriorates, the relation between the sensor value and density can be made close to the initial value by correction.

Figure 14:
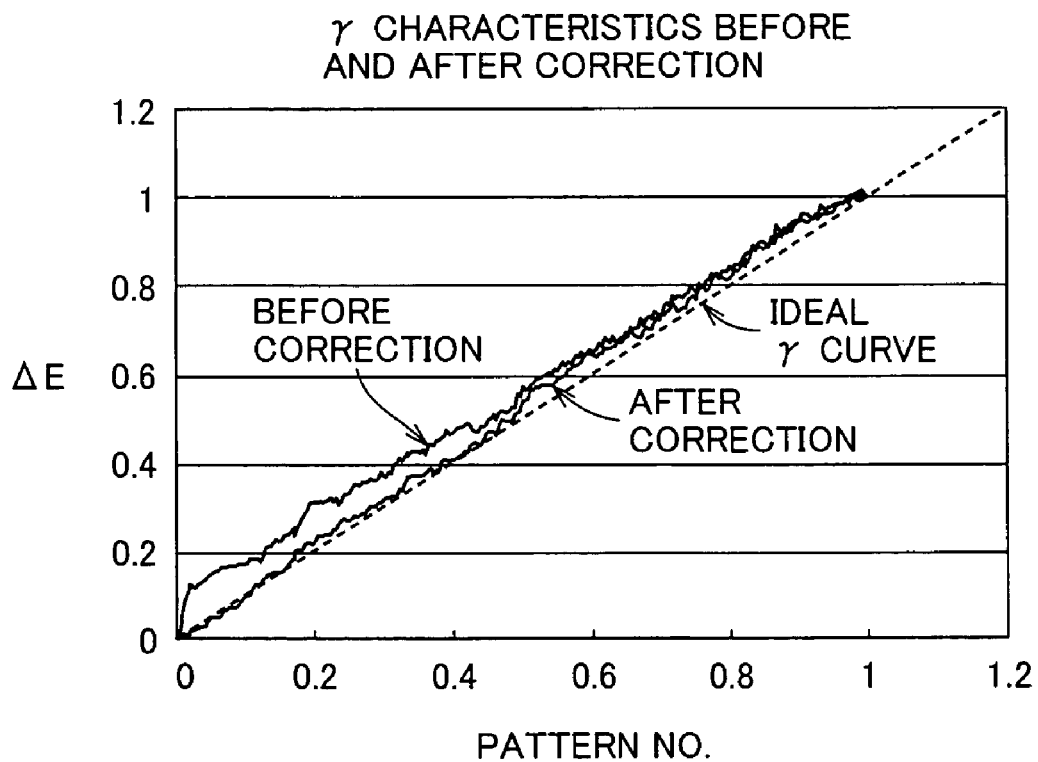
FIG. 14 is a diagram showing an example of the γ characteristic curve.

FIG. 14 is a diagram showing an example of the γ characteristic curve.

Referring to the diagram, there is a problem such that the relation between the sensor value and the density (ΔE) changes and a γ curve calculated from an ideal γ curve (broken line) is deviated. In the embodiment, the density of the white patch is measured and a change in the sensor value is corrected. Thus, even if the intermediate transfer belt deteriorates as shown in FIG. 14, the γ curve can be made close to the ideal one by correction.

First Modification

Although the sensor value is corrected in consideration of the influence degree coefficient in the second embodiment, correction can be made on the basis of the white patch measurement value without considering the influence degree coefficient. Specifically, a fluctuation in luster of the intermediate transfer belt is read from a white patch detection value (Wi) and a sensor correction value (Si) is obtained by the following equation (1) from a toner density detection value (sensor value: Ti).

$$Si=Ti-\{Wi-(\Sigma Wnw)/nw\} \quad (1)$$

where the variables denote the following values.
Si: i-th sensor correction value
Ti: i-th toner density detection value
B: toner density detection value of black portion
Wi: i-th white patch detection value
nw: the number of white patches When the density gradient of toner patches has directivity (state as shown in FIG. 12), in the case of assembling the influence degree coefficient into the equation (1) for the reason that the fluctuation in luster of the intermediate transfer belt varies according to image density, the equation (1) is changed as follows. "n" denotes the number of toner patches.

In the case from the light side to the dark (Nos. 7 to 127 in FIG. 12)

$$Si=Ti-(n-i)/n\times\{Wi-(\Sigma Wnw)/nw\} \quad (2)$$

In the case from the dark side to the light side $$Si=Ti-(i-n)/n\times\{Wi-(\Sigma Wnw)/nw\} \quad (3)$$

Second Modification

It is also possible to store an initial white patch detection value in the apparatus and subtract it. Specifically, when the initial white patch detection value is set as Wm, a sensor correction value may be derived as follows.

$$Si=Ti-\{Wi-Wm\} \quad (4)$$

Third Modification

In the case where the density gradient of the toner patches has directivity, due to a fluctuation in luster of the intermediate transfer belt according to image density, the equation (4) may be multiplied with the influence degree coefficient.

In the case from the light side to the dark $$Si=Ti-(n-i)/n\times\{Wi-Wm\} \quad (5)$$

In the case from the dark side to the light side $$Si=Ti-(i-n)/n\times\{Wi-Wm\} \quad (6)$$

Fourth Modification

An approximate expression is obtained from nw pieces of Wi and may be subtracted.

Specifically, when an approximate expression is f(i), the following is satisfied.

$$Si=Ti-\{fi-(\Sigma Wnw)/nw\} \quad (7)$$

Fifth Modification

In the case where the density gradient of the toner patches has directivity, due to a fluctuation in luster of the intermediate transfer belt according to image density, the equation (7) may be multiplied with the influence degree coefficient.

In the case from the light side to the dark $$Si=Ti-(n-i)/n\times\{f(i)-(\Sigma Wnm)/nw\}$$

In the case from the dark side to the light side $$Si=Ti-(n-i)/n\times\{f(i)-(\Sigma Wnm)/nw\}$$

At the time of calculating the influence degree coefficient, n may be the total number of dither patterns used, and i may be the dither pattern number of a measurement patch.

Sixth Modification

A fluctuation in environment may be measured by forming a toner patch on a photosensitive member and measuring it.

Seventh Modification

Figure 16:
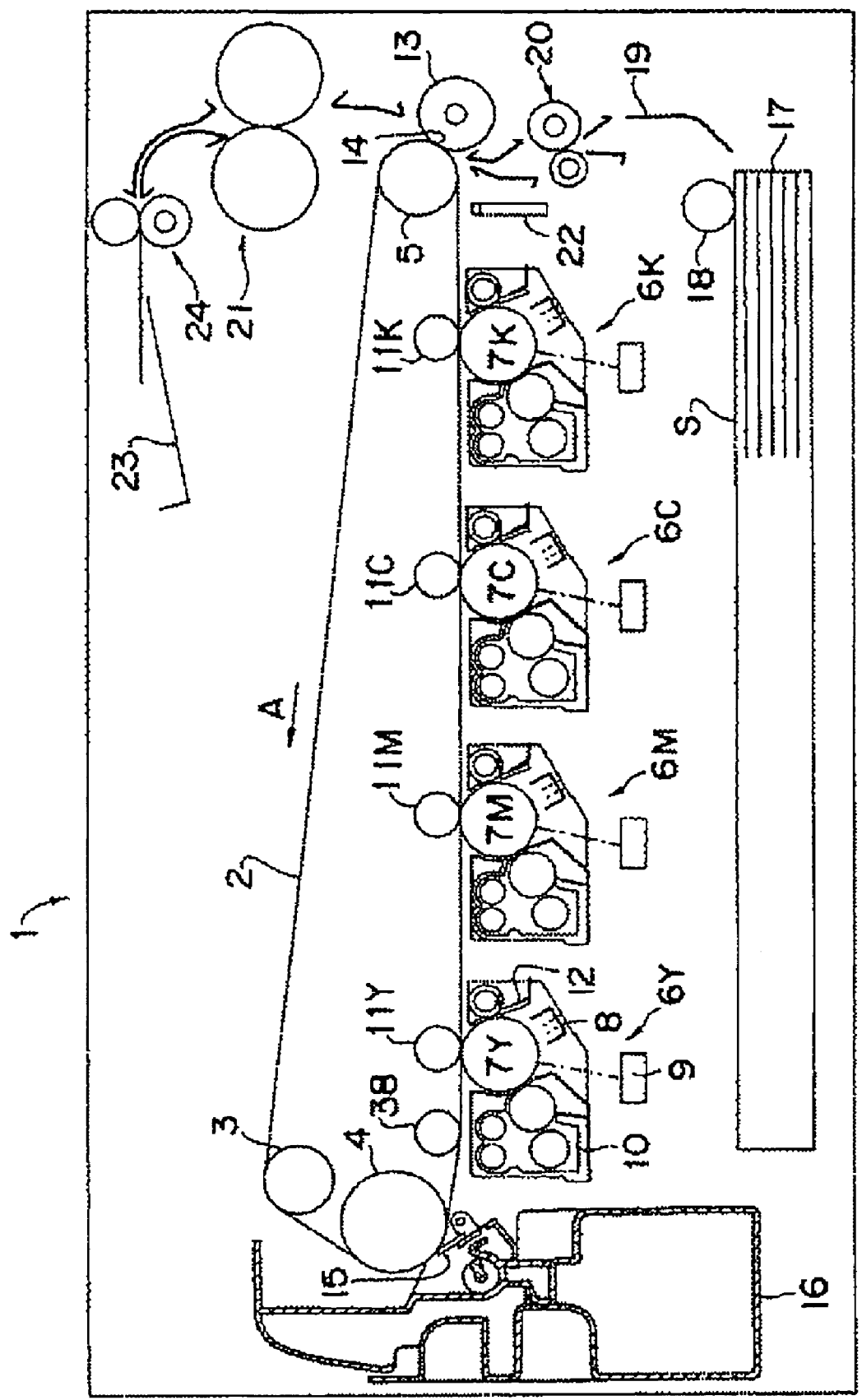
FIG. 16 is a diagram showing the configuration of a tandem-type laser printer.

Image output apparatus 102 may have the configuration of a tandem laser printer shown in FIG. 16 in place of the configuration of the 4-cycle full-color laser printer shown in FIG. 2.

Referring to FIG. 16, the tandem laser printer has, in an almost center portion, an intermediate transfer belt 2 as a belt member. Intermediate transfer belt 2 is supported by the peripheral portions of three rollers 3, 4, and 5 and is rotated in the direction of the arrow A. Roller 3 is a tension roller which gives tension to intermediate transfer belt 2. Roller 5 is coupled to a not-shown drive motor. Rollers 3 and 4 are driven by rotation of roller 5.

Below the lower horizontal part of intermediate transfer belt 2, four image forming units 6Y, 6M, 6C, and 6K corresponding to yellow (Y), magenta (M), cyan (C), and black (K), respectively, are arranged along intermediate transfer belt 2.

Image forming units 6Y, 6M, 6C, and 6K have photosensitive drums 7Y, 7M, 7C, and 7K, respectively. Around each of photosensitive drums 7Y, 7M, 7C, and 7K, in order in the rotation direction, a charger 8, a print head unit 9, a developer 10, a corresponding one of primary transfer rollers 11Y, 11M, 11C, and 11K facing photosensitive drums 7Y, 7M, 7C, and 7K, respectively, over intermediate transfer belt 2, and a cleaner 12 are disposed.

A secondary transfer roller 13 is pressed against the portion of intermediate transfer belt 2, which is supported by roller 5. A nip portion between secondary transfer roller 13 and intermediate transfer belt 2 is a secondary transfer area 14.

A belt cleaner 15 for scraping off the residual toner on intermediate transfer belt 2 and collecting the residual toner into a waste toner box 16 is pressed against the portion supported by roller 4, of intermediate transfer belt 2.

In a lower part of the printer, a paper feed cassette 17 is detachably disposed. Sheets S of paper stacked and housed in paper feed cassette 17 are sent to a conveyance path 19 one by one from the uppermost one by rotation of a paper feed roller 18.

Conveyance path 19 extends from paper feed cassette 17 via a nipped portion between a conveyance roller pair 20, secondary transfer area 14, a fixing roller 21, and a paper ejection roller 24 to a paper ejection tray 23.

An AIDC (image density) sensor 22 also serving as a resist sensor is disposed between image forming unit 6K on the most downstream side of intermediate transfer belt 2 and secondary transfer area 14. Resist sensor 22 measures an interval between patters of each color formed on intermediate transfer belt 2, compares it with a predetermined reference value and, on the basis of the comparison result, adjusts a write start timing of an image of each color.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dither pattern generating apparatus comprising:
   a generator to generate a plurality of measurement patterns on the basis of a plurality of dither patterns corresponding to a measurement pattern;
   a sensor to measure a density within an image output device of each of said generated plurality of measurement patterns;
   an obtaining unit to obtain a change in environment in which the apparatus is used;
   a corrector;
   a converter to convert a sensor value of each of the plurality of measurement patterns obtained by said sensor into a print density based on a conversion algorithm; wherein the corrector corrects the sensor value obtained by said sensor or the conversion algorithm of said converter in accordance with a result obtained in said obtaining unit;
   a calculator to calculate a γ characteristic curve associating the plurality of measurement patterns with print densities on the basis of the print densities of the plurality of measurement patterns converted by said converter; and
   a dither pattern generator to generate a dither pattern on the basis of said calculated γ characteristic curve.

2. The dither pattern generating apparatus according to claim 1, wherein
   said obtaining unit obtains data regarding a situation in which the apparatus is used, and
   said corrector corrects the conversion algorithm of said converter by changing a sensor density curve associating sensor values with print densities, which is used in said converter.

3. The dither pattern generating apparatus according to claim 2, wherein said obtaining unit obtains the number of print sheets as data regarding the situation in which the apparatus is used.

4. The dither pattern generating apparatus according to claim 2, wherein
   said corrector selects a proper sensor density curve from a plurality of sensor density curves prepared on the basis of data regarding situations of environment and endurance and another situation in which the apparatus is used.

5. The dither pattern generating apparatus according to claim 2, wherein
   said corrector corrects a prepared sensor density curve on the basis of data regarding situations of environment and endurance and another situation in which the apparatus is used.

6. The dither pattern generating apparatus according to claim 1, wherein
   said obtaining unit obtains data regarding the state of a medium on which said plurality of measurement patterns are formed.

7. The dither pattern generating apparatus according to claim 6, wherein
   said obtaining unit obtains data by measuring densities of portions in which the measurement patterns are not formed in said medium.

8. The dither pattern generating apparatus according to claim 6, wherein
   said corrector corrects said sensor value on the basis of the data regarding the state of said medium.

9. The dither pattern generating apparatus according to claim 6, wherein
   said generator transfers a plurality of toner patches having various densities as a plurality of measurement patterns onto an intermediate transfer belt of said image output device and disposes white patches around the toner patches,
   said obtaining unit reads a fluctuation in luster of said intermediate transfer belt on the basis of measurement values of said white patches measured by said sensor, and
   said corrector corrects said sensor value on the basis of said fluctuation in luster.

10. The dither pattern generating apparatus according to claim 9, wherein
    density changes in said plurality of toner patches have directivity, and
    said corrector makes correction using an influence degree coefficient based on said directivity.

11. The dither pattern generating apparatus according to claim 10, wherein
    said influence degree coefficients of the number corresponding to the number of dither patterns used are calculated, and an influence degree coefficient which varies according to a dither pattern is used.

12. The dither pattern generating apparatus according to claim 9, further comprising:
a storage to store an initial white patch detection value, wherein said corrector makes a correction using an initial white patch detection value.

13. The dither pattern generating apparatus according to claim 9, wherein
a luster fluctuation in said intermediate transfer belt is calculated by an approximate expression.

14. The dither pattern generating apparatus according to claim 9, wherein
a toner patch is formed on a photosensitive member in place of the intermediate transfer belt.

15. The dither pattern generating apparatus according to claim 1, wherein
said converter calculates an actual print density from a sensor value by using a sensor density curve,
said calculator approximates a γ characteristic curve, and
said dither pattern generator generates a dither pattern whose γ characteristic is linear from the approximated γ characteristic curve.

16. A dither pattern generating method comprising the steps of:
generating a plurality of measurement patterns on the basis of a plurality of dither patterns corresponding to a measurement pattern;
measuring a density within an image output device of each of said generated plurality of measurement patterns by a sensor;
obtaining a change in environment in which the apparatus is used;
correcting the sensor value obtained by said sensor or a conversion algorithm in accordance with a result obtained in said obtaining step;
converting a sensor value of each of the plurality of measurement patterns obtained by said sensor into a print density based on the conversion algorithm;
calculating a γ characteristic curve associating the plurality of measurement patterns with print densities on the basis of the print densities of the plurality of measurement patterns converted in said converting step; and
generating a dither pattern on the basis of said calculated γ characteristic curve.

17. A computer readable medium storing a dither pattern generating program product which makes a computer execute the steps of:
generating a plurality of measurement patterns on the basis of a plurality of dither patterns corresponding to a measurement pattern;
measuring a density within an image output device of each of said generated plurality of measurement patterns by a sensor;
obtaining a change in environment in which the apparatus is used;
correcting the sensor value obtained by said sensor or a conversion algorithm in accordance with a result obtained in said obtaining step;
converting a sensor value of each of the plurality of measurement patterns obtained by said sensor into a print density based on the conversion algorithm;
calculating a γ characteristic curve associating the plurality of measurement patterns with print densities on the basis of the print densities of the plurality of measurement patterns converted in said converting step; and
generating a dither pattern on the basis of said calculated γ characteristic curves.

* * * * *

UNITED STATES PATENT AND TRADEMARK OFFICE
CERTIFICATE OF CORRECTION

PATENT NO. : 7,639,377 B2 Page 1 of 1
APPLICATION NO. : 11/008223
DATED : December 29, 2009
INVENTOR(S) : Aihara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1418 days.

Signed and Sealed this

Ninth Day of November, 2010

David J. Kappos
*Director of the United States Patent and Trademark Office*